Feb. 27, 1945.   F. WETHLY   2,370,277
TREATMENT OF ACID-TAR
Filed Nov. 12, 1941
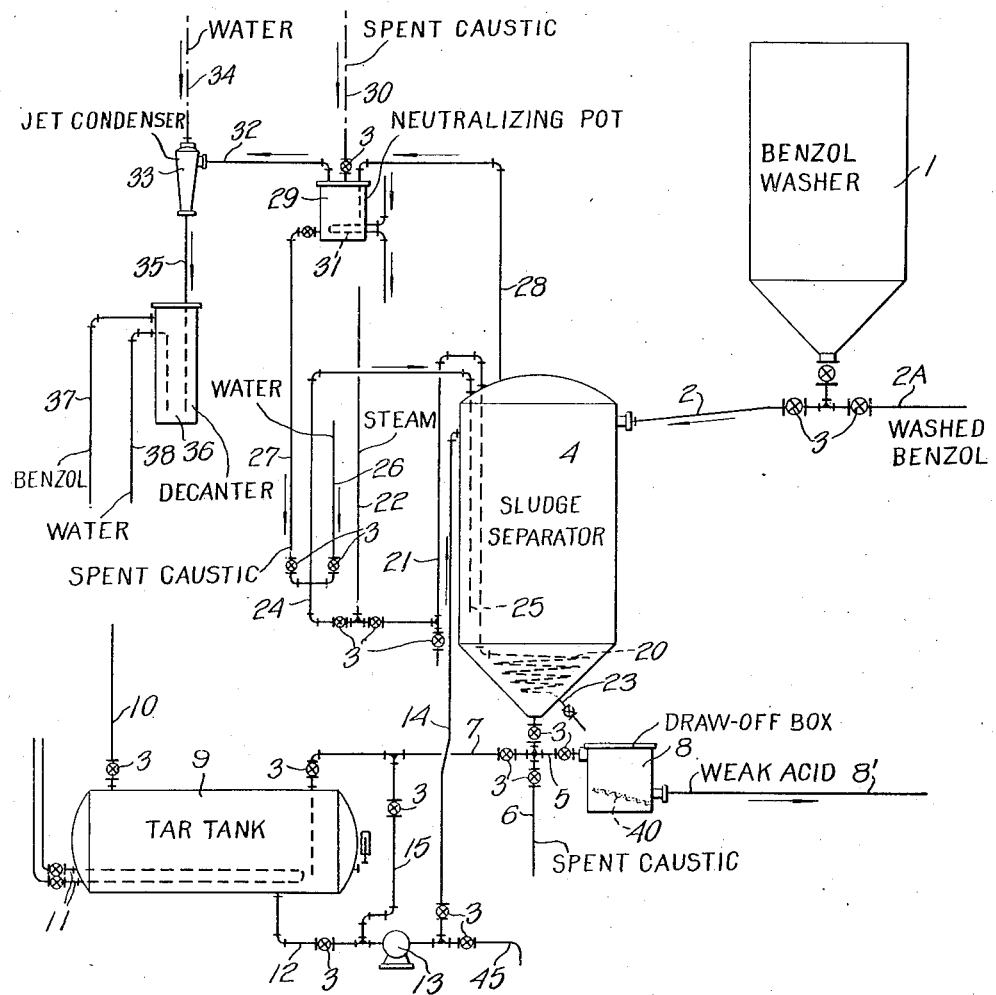
INVENTOR
FRANS WETHLY
BY
John E. Hubbell
ATTORNEY Patented Feb. 27, 1945

2,370,277

UNITED STATES PATENT OFFICE 2,370,277

TREATMENT OF ACID-TAR

Frans Wethly, Manhasset, N. Y., assignor to Fuel Refining Corporation, New York, N. Y., a corporation of Delaware Application November 12, 1941, Serial No. 418,863

1 Claim. (Cl. 196—148)

The general object of the present invention is to provide an improved method of treating the acid-tar formed in the acid wash process of refining benzol. A more specific object of the invention is to provide a method of acid-tar treatment in which the recoverable benzol and sulphuric acid constituents of the acid-tar are separated and removed leaving a slurry residue which may be mixed with and dissolved in tar, and which may be economically disposed of by using the solution as a fuel, or as a stock material for treatment in a tar refinery.

The invention was primarily devised and is especially adapted for use in connection with the operation of a by-product plant in which ammonia, tar and benzol are separated from coke oven and other coal distillation gases. In such plants it is customary to first separate tar and fixed ammonia from the distillation gases, and then to recover the remaining free ammonia from the distillation gases in the form of ammonium sulphate by passing said gases through a saturator including a weak sulphuric acid bath, after which the gas is passed through benzol scrubbing apparatus in which the benzol is absorbed by a wash oil, which in this country is customarily a petroleum product known as straw oil. The benzol is then separated from the wash oil which is thereby regenerated, and the benzol thus separated from the wash oil is subjected thereafter to preliminary refining treatments including the separate washing of the benzol with caustic soda and with strong sulphuric acid.

The acid wash treatment results in the production of a tar-acid residue, comprising a considerable quantity of acid, and dissolved and entangled benzol and resins. Various processes are known for recovering benzol and a weak sulphuric acid solution from the acid-tar. Those processes have left a slurry-like residue including tar, the disposal of which has been practically difficult heretofore.

In accordance with the present invention, the tar-acid is subjected to heating, agitating and washing treatments in a sludge separator, in the course of which the recoverable benzol and weak acid solution returnable to the ammonia saturator, are separately withdrawn, and in which the slurry residue is thereafter mixed with and dissolved in the tar solvent to form a mixture well adapted for use as a fuel or as a stock material for treatment in tar refining processes.

The various features of novelty which characterize the present invention are pointed out with particularity in the claim annexed to and forming a part of this specification. For a better understanding of the invention, however, its advantages and specific objects attained with its use, reference should be had to the accompanying drawing and the following descriptive matter in which I have diagrammatically illustrated and described a preferred form of the present invention.

The one figure of the drawing is a flow diagram.

The drawing illustrates diagrammatically the essential elements and element relation of a desirable form of apparatus for use in the practice of the present invention. The apparatus illustrated comprises a benzol washer which is of conventional type, and is provided with a valved bottom outlet adapted to be connected alternately to an acid-tar draw-off pipe 2, and to a wash benzol pipe 2A. The benzol washer outlet, and pipes 2 and 2A include separate control or cut-off valves as do many other portions of the apparatus, and each of those valves is designated by the symbol 3. The pipe 2 delivers the acid-tar passing through it into the upper end of a sludge separator 4. The latter as shown in a vertically disposed tank, is formed with a conical bottom with a central valved outlet adapted to be connected alternatively to pipes 5, 6 and 7. The pipe 5 is provided to pass weak acid from the sludge separator into a draw-off box 8, from which the weak acid may be passed through a pipe 8' to the saturator (not shown) provided to convert the free ammonia content of coal distillation gases into ammonia sulphate. The pipe 6 is intended for use in discharging spent caustic to waste. The pipe 7 is provided to convey material from the sludge separator into a tar or solvent tank 9, which may receive tar from any suitable source through a supply pipe 10. The tar in the tank 9 may be heated by a suitable steam heating device 11, and the tank 9 has a bottom tar outlet adapted to be connected by a pipe 12 to the inlet of a circulating pump 13.

The pump 13 has an outlet pipe 14, opening to the sludge separator 4 adjacent the upper end of the latter. The pipes 7 and 12 are connected by a by-pass 15. By opening or closing a cut-off valve 3 in the pipe 12 between the points at which it is connected to the pipe pass 15 and to the tar tank and simultaneously closing or opening the cut-off valve 3 in the by-pass 15, the pump 13 may be used either to recirculate fluid material through the sludge separator 4 and tar tank 9 or in recirculating fluid material through the sludge separator 4 and the bypass 15.

A steam coil 20 located in the lower portion of the sludge separator 4 forms a closed steam heater for material in said separator. Steam is supplied to coil 20 through a connection 21 from a steam supply pipe 22 and said coil has a valved outlet 23 for the discharge of water of condensation. The pipe 22 may also supply steam to a pipe 24, which extends, and discharges steam into the sludge separator 4 having its depending discharge end 25 located in the lower portion of the separator, but somewhat above top of the steam coil 20. The pipe 24 is also connected to a wash water supply pipe 26 and to a caustic soda supply pipe 27 so that by opening one or another and closing the other two of the three cut off valves 3 in the pipes 22, 26 and 27, either steam, wash water or caustic soda may be passed into the sludge separator 4 through the pipe 24.

Vapors evolved in the sludge separator 4 pass away from the latter through a vapor outlet pipe 28, connected to the separator at its upper end, and having a liquid sealed outlet in a neutralizing pot or receptacle 29, which is adapted to receive spent caustic through a pipe 30 from the benzol washer or from some storage receptacle (not shown) into which the spent caustic is passed from the benzol washer. A steam coil 31 is provided for heating the pot or receptacle 29. Vapors pass away from the latter through an outlet pipe 32, which leads to the vapor inlet of a condenser 33 shown as a vent condenser to which condensing water is supplied by a pipe 34. The condenser outlet pipe 35 leads to a decanter 36, the latter is provided with an upper outlet 37 for the discharged benzol separating out of the water and benzol mixture entering the decanter. The outlet 37 may lead to a benzol or light oil storage reservoir (not shown). The decanter is also provided with a lower water outlet 38, which may discharge to waste.

In the normal use contemplated of the apparatus diagrammatically illustrated, a charge of acid-tar is periodically passed into the sludge separator 4 from the benzol washer 1 through the pipe 2. To the acid-tar charge thus introduced into the separator 4, about 80% by volume of water is added, and the separator is then heated up and its contents agitated for a period of 45 minutes or so to vaporize the benzol content of the charge. The benzol vapors formed pass away from the separator through the pipe 28 to the acid neutralizing pot 29, and thence to the condenser 33 in which they are condensed. From the condensate thus formed, liquid benzol is separated in the decanter 36 and is discharged from the latter through the pipe 37.

The heating of the charge in the separator 4 may be due wholly to the steam coil 20, in which case all of the water added to the charge is supplied by the pipe 26, or may be due in part to the injection into the separator 4 of steam supplied by the pipe 22, in which case some, at least, of the water added to the charge will be water of condensation formed in the separator. The agitation of the charge during the benzol vaporizing period is effected by recirculating action of the pump 13, which is then operated to withdraw fluid material from the separator through the pipe 7 and by-pass pipe 15, and to return the material to the separator through the pipe 14.

Following the benzol vaporizing period of 45 minutes or so, the charge is allowed to remain quiescent in the sludge separator 4 for a period, ordinarily of about four hours, to permit of a gravitational separation of the tar into a lower relatively heavy stratum of weak acid and an upper relatively light slurry like, resin containing, residue.

After the weak acid and tar are thus segregated the bottom outlet of the separator 4 is connected to the draw-off box 8 for the passage of the weak acid into the draw-off box, and thence through the pipe 8' to the saturator (not shown) or a suitable storage receptacle. The draw-off box may advantageously be provided with an inclined screen or spreader 40, on to which the weak acid stream from the separator flows and is spread out so that the operator can readily see just when the inflow of weak acid ceases and the residue starts to enter the draw-off box and thereupon the connection between the draw-off box 8 and the separator 4 is immediately closed.

Following the discharge of the weak acid in the manner above described, spent caustic may be passed from the neutralizing pot 29 through the pipes 27 and 24 into the sludge separator to neutralize the acid content of the slurry like residue remaining in the separator. While the caustic soda thus supplied to the sludge separator may well be so far spent as to be valueless for other purposes, it is still capable of neutralizing acid remaining in the acid-tar residue. In the caustic soda treatment of residue in the separator 4, the caustic may be drawn off and discharged to waste through the pipe 6.

Following this neutralization step, or directly after the discharge of the weak acid from the separator if the neutralization step is omitted, as it may well be in some cases, the valves in the pipes 5, 12 and 15 are adjusted so that the pump 13 will set up a flow of material from the tank 9 through pipes 12 and 14 into the separator 4, and from the latter through the pipe 7 into the tank 9. This recirculation of the contents of the tank 9 and separator 4 effectively mixes the tar and residue and agitates the mixture and thus causes the residue to completely and with relative rapidity dissolve in the tar tank. The volume of tar into which the residue is thus dissolved may well be about double the volume of the residue, and the residue content of the solution formed, will not prevent the solution from being used as a fuel, or as a stock material in a tar refinery, substantially as the tar could be used if no acid-tar residue were dissolved in it.

Ordinarily a period of about 30 minutes or less, is required to dissolve the acid-tar residue in the tar. At the conclusion of the dissolving action, the valves are adjusted to permit the sludge separator 4 to be emptied by continuing the operation of the pump, and thus put the separator into condition to receive the next batch or charge of acid-tar from the benzol washer 1. In some cases, the pump may have a separate valved outlet 45 through which the pump 13 may draw the tar in which the residue has been dissolved from the tank 9 and pass it to a suitable storage place or place of use.

Throughout the period following the benzol vaporizing action and continuing until the separator is emptied preparatory to the reception of a new acid-tar charge, the temperature of the sludge separator is maintained by steam supplied to the coil 20.

Merely by way of illustration and example, I note that for the convenient treatment in accordance with the present invention of the acid-tar formed in a by-product coke oven plant carbonizing 1500 tons of ordinary coking coal per day, the sludge separator 4 may well be of 3,000 gallon capacity.

While the apparatus disclosed is desirably simple and well adapted for use in the practice of my present invention, it will be apparent to those skilled in the art that other forms of apparatus may be used in the practice of the method disclosed and claimed herein.

Having now described my invention, what I claim as new and desire to secure by Letters Patent is:

The method of treating acid-tar formed in washing crude benzol with sulphuric acid, which consists in adding water to the acid-tar, and heating and agitating the mixture to vaporize and remove its benzol constituents thereafter maintaining the acid-tar quiescent to effect the gravitational separation of its weak acid and slurry-like residue constituents and then mixing said residue with hot tar and agitating the mixture and thereby dissolving said residue in said tar.

FRANS WETHLY.